US008987931B2

(12) United States Patent
Marley, II

(10) Patent No.: US 8,987,931 B2
(45) Date of Patent: Mar. 24, 2015

(54) FLEXIBLE ENERGY BALANCING SYSTEM

(71) Applicant: Renewable Power Holdings, Inc., Englewood, CO (US)

(72) Inventor: Paul C. Marley, II, Houston, TX (US)

(73) Assignee: Renewable Power Holdings, Inc., Englewood, CO (US)

( * ) Notice: Subject to any disclaimer, the term of this patent is extended or adjusted under 35 U.S.C. 154(b) by 30 days.

(21) Appl. No.: 13/664,397

(22) Filed: Oct. 30, 2012

(65) Prior Publication Data

US 2013/0106110 A1    May 2, 2013

Related U.S. Application Data

(60) Provisional application No. 61/554,475, filed on Nov. 1, 2011.

(51) Int. Cl.
| | | |
|---|---|---|
| *F01D 15/10* | (2006.01) | |
| *F02C 6/00* | (2006.01) | |
| *H02P 9/04* | (2006.01) | |
| *F02C 6/18* | (2006.01) | |
| *F01K 23/10* | (2006.01) | |

(52) U.S. Cl.
CPC ... *F02C 6/00* (2013.01); *F02C 6/18* (2013.01); *F01K 23/10* (2013.01)
USPC .......................................................... 290/52

(58) Field of Classification Search
CPC ................ F02C 6/00; F02C 6/02; F02C 6/18; Y02E 20/16; Y02E 10/00; F01K 23/10
USPC ............. 290/52, 1 A, 4 R, 4 D, 44, 55, 43, 54
See application file for complete search history.

(56) References Cited

U.S. PATENT DOCUMENTS

| | | | |
|---|---|---|---|
| 6,670,721 | B2 | 12/2003 | Lof et al. |
| 7,274,111 | B2 * | 9/2007 | Andrew et al. ................. 290/52 |
| 8,008,808 | B2 | 8/2011 | Seeker et al. |
| 2010/0127570 | A1 | 5/2010 | Hadar et al. |
| 2010/0301062 | A1 | 12/2010 | Litwin et al. |
| 2011/0215640 | A1 | 9/2011 | Donnelly |

* cited by examiner

*Primary Examiner* — Javaid Nasri
(74) *Attorney, Agent, or Firm* — Sheridan Ross P.C.

(57) ABSTRACT

An energy balancing system is provided that ensures continuous energy output to compensate for energy fluctuations commonly associated with wind power generation. The flexible energy balancing system employs a base load high-pressure steam boiler that is associated with one or more steam turbine generators. The steam turbine generators are also associated with one or more heat recovery steam generators whose temperature is controlled by the exhaust from combustion turbine generators and the base load high-pressure steam boiler. The energy balancing system can be selectively tuned to quickly compensate for energy fluctuations associated with wind power generation.

7 Claims, 1 Drawing Sheet

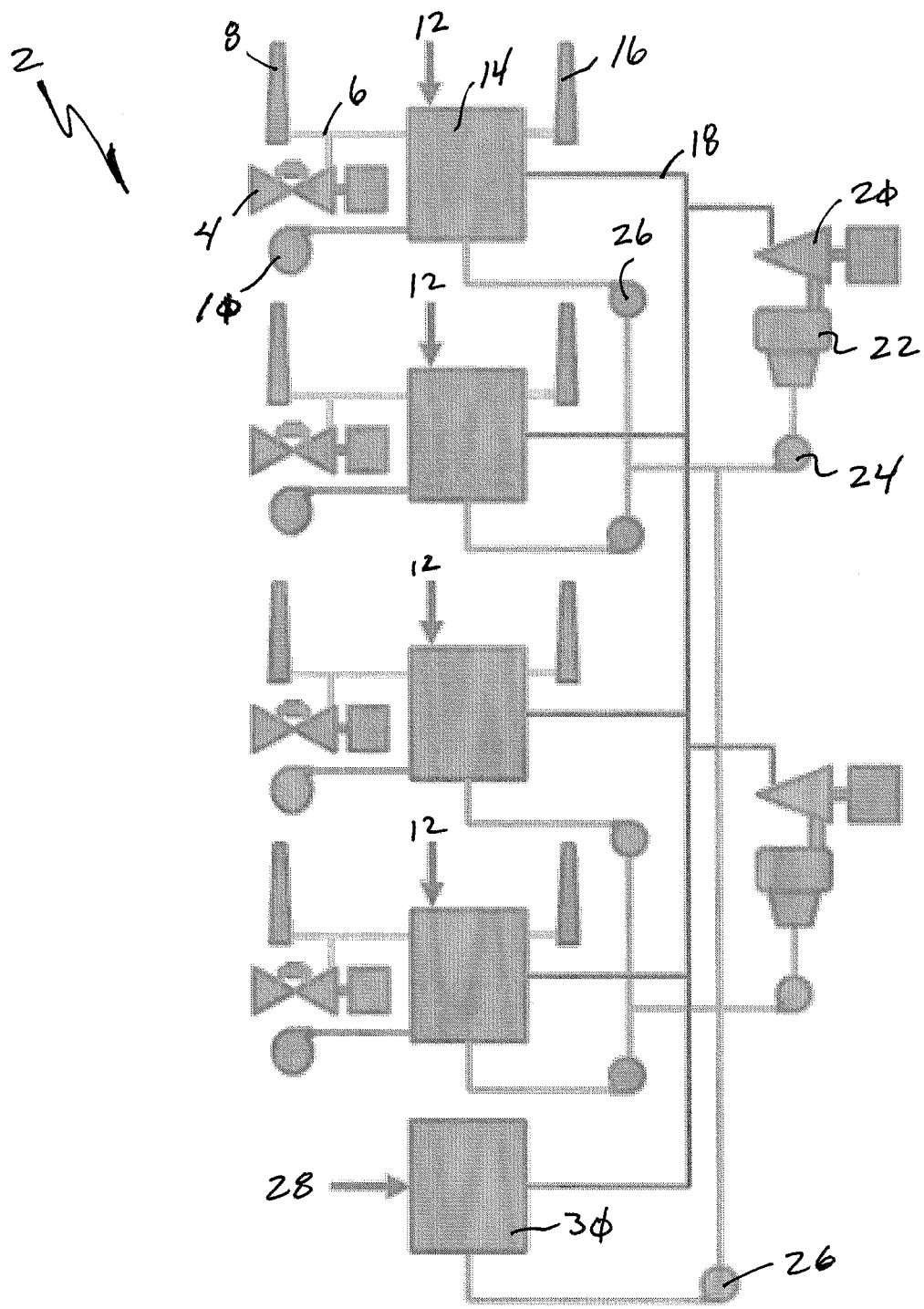

FLEXIBLE ENERGY BALANCING SYSTEM

This application claims benefit of U.S. Provisional Patent Application Ser. No. 61/554,475, filed Nov. 1, 2011, the entire disclosure of which is incorporated by reference herein.

FIELD OF THE INVENTION

Embodiments of the present invention generally relate to a flexible spinning reserve for an energy balancing system used to ensure continuous energy output for intermittent power generation. More specifically, one embodiment of the present invention is a continuously running auxiliary power source associated with a wind power generating facility that rapidly and selectively changes the amount of power delivered to a power grid to supplement wind turbine power generation, which increases and decreases with changes in wind velocity and conditions, to deliver a steady total amount of electrical energy.

BACKGROUND OF THE INVENTION

Many states have adopted Renewable Portfolio Standards (RPS) that require electric utility companies to include a minimum amount of renewable energy generation as a percentage of the electric energy sold to their retail customers. The minimum RPS level will increase over time for most states. The federal government may soon implement a Renewable Electricity Standard (RES) that would be similar to the "renewables obligation" imposed in the United Kingdom. These standards place an obligation on electricity supply companies to produce a specified fraction of their electricity from renewable energy sources, such as wind, solar, hydroelectric, geothermal, biofuels, and biomass.

Further, the global initiative to reduce carbon emissions combined with the increasing cost and political uncertainty of fossil fuels has created a robust market for renewable energy. This market is accelerated by the regulations mentioned above, that require electric utilities to purchase a minimum amount of renewable energy, and by government subsidies (e.g., tax credits) for certain types of renewable energy technology. While some renewable energy facilities pay little to nothing for fuel, the low efficiency and high capital cost of the currently available power-generation technologies results in net costs that are significantly higher than those associated with traditional power generation techniques based on fossil fuels. For example, wind and solar energy have the widest geographic availability, but they also have low energy density.

More specifically, wind and solar power facilities must cover large geographic areas due to their low energy density to achieve the economies of scale required to justify the large construction investments, which increases the costs associated with connecting to the local power grid. Wind power generation has a lower capital cost per megawatt of installed capacity than solar power generation. Wind farms can also be installed around existing infrastructure (i.e. on buildings, above roads and farm fields, etc.). Together, these two conditions have resulted in the development of a large number of wind generation projects across the globe.

Wind turbines, however, have several technical constraints that affect performance. For example, 7-10 mph is typically the minimum wind speed required to turn a wind turbine fast enough to generate any usable electrical power. Further, wind turbines do not generate full rated power until the wind reaches a predetermined design speed, which is typically about 25-35 mph. When the wind speed is greater than about 50 mph, turbines must be turned off to avoid over-speed damage. These design constraints, along with wind variability, result in a very low capacity factor, i.e. total energy, in megawatt-hours, generated per year divided by the product of rated capacity, in megawatts, and 8760 hours per year. Wind generation facilities typically have a capacity factor of 25-35%. A solar farm may have a capacity factor of 40-45%, coal burning power plants have a capacity factor of 60-80%, and nuclear power plants have a capacity factor of 70-90%.

Electric utilities are tasked with providing reliable electric service to all customers, and so the dependence on large amounts of generation from often-variable and dynamic wind fluctuations is detrimental to power grid stability. Currently, to quickly address additional power load demands or balance load reductions, on-line generators are used to ramp up or down power generation to match a new load demand. Commonly, utilities operate a number of generators in parallel to provide base load capacity (typically the most efficient, running 24/7), cycling capacity (which cycle up and down with daily load fluctuations), and peaking capacity (to meet sudden short term or peak load demands).

When utilities are using intermittent generation sources, such as wind energy, fluctuations in the wind generation must also be balanced relative to the other utility generation sources. Thus a "spinning reserve" is needed that is a function of the energy-producing units that are already in operation. If the capacity of wind generation changes, up or down, more than what the other utility generators can absorb, this causes instability that must be absorbed across the entire grid. If a utility cannot balance all the up and down fluctuations from the connected wind generation in its service territory, the utility will not be able to schedule reliable electrical service to its customers without some deficiencies in power quality, such as voltage regulation, reactive load, and frequency regulation. Given that most utilities operate with only a 15% to 25% reserve capacity margin, which is primarily designed to cover scheduled and forced outages of their primary generating plants, the amount of flexible generating capacity for balancing energy becomes the limiting factor in the amount of wind generation that can be managed for a given utility.

The primary method used by utilities to convert fuel energy into electricity is to burn fuel (coal or gas, for example), recover the thermal energy as high pressure superheated steam, and use the steam to drive a steam turbine generator. Steam turbine generators (STG's) are used in coal plants, nuclear plants, gas fired boilers, waste-to-energy, biomass-to-energy, waste heat recovery, and in a portion of gas fired combined cycle plants. Starting the STG from a "cold iron" condition requires several hours because the temperature of the entire system, including the STG, must be slowly raised to avoid excessive thermal stresses which could damage the generator. If starting from "hot standby" mode, the STG may still take up to an hour to start generating power because the turbine spin rate must be slowly and carefully increased while passing through critical resonance speeds that can cause excessive vibrations and generator damage. Once operating, changing the power output of steam turbine generators is limited by the speed that additional feed water can be brought up to a boil to produce the additional steam required to turn the turbine.

While STG's can balance some of the fluctuations associated with wind speed variations and instability, there are conditions that require much faster and larger power output. Utilities typically use fast starting (nominally about 10 minutes) gas fired simple cycle combustion turbines to provide this type of response. By contrast, a combined cycle combustion turbine plant generates about 50% more electricity for the same fuel input. More specifically, a combined cycle system uses a heat recovery steam generator that draws heat from the exhaust of a simple cycle process to generate additional high pressure superheated steam to drive a STG. A simple cycle combustion turbine, however, avoids the delays associated with starting the steam system in a combined cycle plant. A simple cycle is penalized with a much higher heat rate (i.e., the rate of fuel consumption per kilowatt-hour [kWh] of generation) because a simple cycle system simply sends hot exhaust gases from the gas turbine directly to the atmosphere.

As more and more wind capacity is placed into service, the market requires more flexible capacity that can be dispatched on short notice to balance the up and down fluctuations of wind generation. With fossil fuel prices much higher than historical averages, it is also important that the additional capacity be generated as fuel efficiently and economically as possible. The market demand is for flexible spinning reserve capacity that can be economically used to balance wind generation.

Thus, it is a long felt and fundamental need in the field of wind power generation to provide a balancing system that addresses fluctuations and power generation instabilities. The following disclosure describes an improved energy balancer that works in conjunction with a wind power facility to ensure that the needed power is consistently generated. As requirements for renewable energy increase, utilities will need resources that have more flexibility than the traditional increments of base-load, cycling, and peaking capacity. Load management will require flexible spinning reserve as intermittent resources are added to the generation mix. This resource configuration, as described below, will be able to supplement all of the traditional utility resources in addition to providing the flexibility required to manage wind generation.

SUMMARY OF THE INVENTION

It is one aspect of the present invention to provide stable power for a utility system that is dependent, at least partially, on wind-generated power. More specifically, to provide reliable service, power fluctuations must be balanced by utilities to meet increases and decreases in both generation and customer demand. Power companies estimate power use on a day-to-day basis to dynamically change the amount of power output to meet customer demand. As discussed above, existing coal-fired energy producing facilities use a boiler to change heat energy taken from burning coal into high pressure steam that drives a steam turbine generator (STG). Starting a STG is a complex process and often takes many hours to accomplish because heating the turbine must be carefully controlled to ensure that the components of the STG are not damaged by rapid heating. Thus utilities traditionally use gas-fired simple cycle combustion turbines to provide a quick energy response to meet sudden increases in customer needs. Simple cycle devices simply burn the fuel to drive a generator; such systems are inefficient, and thus expensive, as excess heat is dumped into an exhaust system and not used to drive another heat cycle. As starting up a STG takes a great amount of time, utilities must estimate their total energy needs up to six hours in advance.

Wind turbines have become increasingly more popular as a source of renewable energy due to their low cost and easy installation (relative to solar technologies). Thus, power grids of the future will depend greatly on wind turbine power generation. As one of skill in the art will appreciate, energy generated by wind turbines is totally dependent on wind speed, and thus power generated by a wind turbine farm is unstable. As a consequence, a secondary power generation system is required to balance energy production when wind production falters. An unbalanced system equates to increased system expense because energy must be bought at a premium from other sources on short notice to meet customer demand.

Thus it is one aspect of embodiments of the present invention to provide a continuously running energy balancing system that meets customer demand if and when the power generated by the wind turbines falls below an acceptable level. More specifically, one embodiment of the present invention employs a boiler that is interconnected to at least one STG that provides a base load that is added to the load generated by the wind turbines. When balancing energy is needed, the load on the STG can be quickly increased because it will not require a cold start protocol. The base load boiler provides steam to the STG while aero derivative combustion turbine technology allows for quick starts (in about 10 minutes) of specific power generation units. The capacity of the STG's above the minimum load is defined as spinning reserve and can be called on much faster than a system that is held in hot standby. This spinning reserve is transformed into electric generation by the steam produced from the exhaust of the combustion turbine generators when each unit is started. While commercial energy contracts are based on "hour ahead" dispatch notice, this system can be used for the "intra-hour" dispatch required to accurately firm up intermittent energy from wind generation.

One embodiment of the present invention employs a series of combustion turbine generators (i.e., jet engines) that drive respective power generators when needed. If the power generated by the combustion turbine generator is sufficient to deliver the required energy production, heat produced by the combustion turbine generator is exhausted. If, however, additional power is needed, the heat generated by the combustion turbine generator is shunted to a heat recovery steam generator. The heat recovery steam generator draws heat from the combustion turbine generator exhaust to produce high pressure superheated steam that is directed to one of the STG's. The exhaust from the heat recovery steam generator is then sent to a primary exhaust stack at a temperature lower than it would have been if directly expelled from the combustion turbine generator. After the heat energy is removed from the steam by the STG, the steam is condensed into water and pumped back to the heat recovery steam generator to complete the steam cycle.

The heat recovery steam generator might also be used with a fresh air firing fan (while directly combusting fuel) to generate steam even when its associated combustion turbine generator is idle. Further, supplemental firing fuel may be selectively added to the heat recovery steam generator, to generate additional steam, if additional power is needed while generating the primary steam from the combustion turbine generator exhaust.

The contemplated energy balancing system may use the various pieces of equipment in different combinations to generate different amounts of power as required. In a first mode of operation, the fresh air firing fan directs combusted fuel and air to the heat recovery steam generator to produce steam to be used by the STG to generate the first increment of balancing power. In a second mode, the combustion turbine generator works alone to generate power needed for balancing power. In another mode of operation balancing energy is provided by power generated by the combustion turbine generator that is combined with the power generated by the STG from steam produced by the heat recovery steam generator (from the exhaust of the combustion turbine generator). In yet another mode of producing balancing power, supplemental firing fuel is added to the heat recovery steam generator to provide additional steam to the STG to supplement the steam produced from the exhaust heat of the combustion turbine.

Unfortunately, the quick start capability of a simple cycle combustion turbines comes with a much higher heat rate (i.e. less fuel efficiency) than a combined cycle system. However, while starting in a simple cycle mode, the linking of a simple cycle combustion system to a pre-heated heat recovery steam generator has the capability of quickly transitioning to a combined cycle mode as additional capacity is required. This provides for more efficient operations once a threshold of dispatch demand is met, for example, when the demand is slightly greater than the capacity of a single combustion turbine. So while the flexibility of simple cycle combustion turbines is maintained, the system has the efficiency of a combined cycle configuration over most of the available capacity dispatch.

Again, the base load high pressure steam boiler takes in fuel and burns it to generate high pressure steam to drive the steam turbine generators to produce a constant amount of power. Thus the base load high pressure steam boiler ensures that the STG's are maintained in an operating condition so that a prolonged start procedure is not required if additional steam is produced from the heat recovery steam generators. The base load steam boiler can also provide a small amount of steam to keep each heat recovery steam generator in a hot standby condition and thus ready for immediate steam production.

It is one aspect of the present invention to provide a system that combines a plurality of heat recovery steam generators and associated combustion turbine generators. In one embodiment of the present invention, a series of heat recovery steam generators, and their associated combustion turbine generators, is employed wherein for every two heat recovery steam generators, one STG is maintained in an operating condition by a base load high pressure steam boiler. Multiple STG's may be interconnected on a single high pressure main steam header. One of skill in the art will appreciate that depending on the size of the base load boiler, the number and size of combustion turbine generators, and the number and size of heat recovery steam generators (with their associated fresh air and supplemental firing capacity), the size and operating parameters of the energy balancing system will vary. That is, the number and interconnections of the individual steam or power-producing components is not critical. Further, one of skill in the art will appreciate that one STG may be associated with one or more than one heat recovery steam generator, for example. This flexibility and redundancy allows for individual components to be taken off line for repair or replacement while still allowing the system to provide balance energy when needed. Thus, the multiple systems of power generating equipment provide for a high reliability factor.

It is another aspect of the present invention to provide a balancing system that provides a continuous range of power outputs instead of a series of stepped power outputs. The prior art methods of balancing power production employ simple cycle combustion turbine generators. Therefore, the amount of balancing power produced would increase incrementally as a function of the number of combustion turbine generators used. For example, one combustion turbine generator might produce fifty megawatts of energy, so when a second would be started, 100 megawatts of energy would be produced. This energy step may be more or less than needed, and thus is inefficient.

Alternatively, embodiments of the present invention, due to their various combinations of energy producing abilities, allow for a non-stepped energy generation. More specifically, upon review of the FIGURE provided below, one of skill in the art will appreciate that some power generating subsystems may be used individually to create the needed power directly wherein others would be working with the heat recovery steam generators to produce energy. Other sub-systems use supplemental fired fuel to increase energy production. Thus the system of one embodiment of the present invention can be selectively tuned to provide exactly the amount of energy required to balance the power grid with the energy generated from intermittent sources. Further, the multiple units of small size aero derivative combustion turbines allow for "bite sized" dispatch of the primary capacity. These small units are then "blended" with the incremental capacity of the boilers, fresh air firing of the heat recovery steam generators, and supplemental firing of the heat recovery steam generators to allow for a smooth power dispatch curve from the minimum load to maximum load by using different combinations of the various components or systems.

It is yet another aspect to provide a resource that can be used to balance a number of different intermittent generation resources to provide firming and shaping energy on an aggregate basis so that steady reliable capacity is delivered. This supports the optimization of the transmission system across a regional market, which improves grid stability. Further, because large amounts of wind power generation can destabilize the load management of most utility systems, new wind projects may be required to provide the firming and shaping energy required to balance the intermittent wind generation sold under future Power Purchase Agreements (PPA's). This resource configuration allows for the most flexible and economically competitive capacity to provide the required balancing energy needed by a given wind project.

It is another aspect of the present invention to provide power load management. For example, the contemplated energy balancing system may also be used to balance intermittent generation from a specific wind project or at the delivery end for a specific utility service area to match a specific load demand. In addition to firming and shaping the renewable energy component, the flexibility can also be used to supplement the peaking capacity needs of a specific utility.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawing and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawing.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 1 is a schematic of an energy balancing system of one embodiment of the present invention.

To assist in the understanding of one embodiment of the present invention the following list of components and associated numbering found in the drawings is provided herein:

| # | Component |
|---|---|
| 2 | Flexible Energy Balancing System |
| 4 | Combustion Turbine Generator (CTG) |
| 6 | CTG Exhaust Ducts |
| 8 | Bypass Stack |
| 10 | Fresh Air Firing Fan |
| 12 | Supplemental Firing Fuel |
| 14 | Heat Recovery Steam Generator (HRSG) |
| 16 | Primary Exhaust Stack |
| 18 | High Pressure (HP) Steam Header |
| 20 | Steam Turbine Generator (STG) |
| 22 | Condenser |
| 24 | Low Pressure (LP) Condensate Pump |
| 26 | HP Feed Water Pump |
| 28 | Base Load Fuel Input |
| 30 | Base Load HP Steam Boiler |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

One embodiment of the present invention is an energy balancing system that possesses fast dispatch time of gas fired simple cycle combustion turbines with the efficiency of a combined cycle system. Once the system is operating, it has the immediate capacity (i.e. spinning reserve) to respond to both up and down capacity requirements with enough flexibility to closely match the variations in wind generated power across a range of dispatch levels from minimum generation up to maximum generation. The variable output of this system will allow for more accurate dispatch orders because any capacity can be delivered (within the designed capacity range of the specific equipment configuration) instead of the "block" dispatch that results from only being able to turn simple cycle combustion turbines either off or on. To achieve this "flexible spinning reserve", a hybrid configuration of multiple trains of equipment, with certain systems interconnected between the trains, will be required. FIG. 1 shows an energy balancing system 2 of one embodiment of the present invention.

Fast-starting aero-derivative type combustion turbine generators 4, with a nominal capacity of about 25-50 MW each, will provide the bulk of the generating capacity for the system. Each combustion turbine 4 will be capable of operating in a simple cycle mode. A minimum of two combustion turbine generators 4 will be used, with any combination of units, from two to the total number of trains installed, being capable of parallel operations and starting/stopping independently. An exhaust duct 6 for each combustion turbine generator 4 will be designed with a damper that will allow a shift in operating mode from simple cycle, with direct exhaust to the atmosphere through a bypass stack 8, to combined cycle, with the exhaust directed through a heat recovery steam generator 14 to the primary exhaust stack 16, while the associated combustion turbine generator is operating.

Steam turbine generators (STG's) require a minimum load to maintain proper operating conditions. Therefore, the first increment of capacity will be provided by a base load fuel input 28 to a steam supply, from one or more boilers 30. One of skill in the art will appreciate that other sources of steady steam supply such as additional HRSGs that are, in one embodiment, continuously operating, may provide a constant supply of high pressure super heated steam that is above the sum of the steam required to operate all steam turbine generators in the system at or above their rated minimum load. The contemplated additional HRSGs could be associated with one or more heat producing components, such as combustion turbine generators described herein. Further, any heat producing device or component which could be used to generate steam can be associated with additional HRSGs to provide the requisite base load.

A minimum of two steam turbine generators 20 will be used in the system. The main high pressure superheated steam header 18 will be cross-connected to all steam turbine generators in the plant. Each steam turbine generator 20 will exhaust into a condenser 22 that will convert the low pressure exhaust steam into water that can be collected and pumped back into the condensate system. A condensate pump 24 discharges from each of the condensers 22 will be cross-connected to the high pressure feed water pump 26 for each of the boilers and/or heat recovery steam generators that are supplying steam to the STG's 20. Starting from minimum load, the STG's 20 will be able to increase power generation as additional steam is provided by the boilers and/or heat recovery steam generators 14. Likewise, once additional load is placed on the STG's 14, they will be able to reduce power generation as fast as the additional steam supply is reduced. The condensers 22 for each steam turbine generator 20 will also be designed to take 100% by-pass steam flow to allow for emergency unloading of the STG's 20.

There will be one heat recovery steam generator 14 for each combustion turbine. When the exhaust from the corresponding combustion turbine 4 is directed to the heat recovery steam generator 14, it will produce high pressure superheated steam that will be delivered through the main steam system to the operating steam turbine generators 20. When the combustion turbine exhaust is not directed to the heat recovery steam generator 14, either because the combustion turbine generator 4 is operating in simple cycle mode (exhausting to the bypass stack 8) or it is idle, the heat recovery steam generator 14 will be kept in a hot standby condition to allow for rapid steam production when required. Starting from a hot standby condition avoids excess thermal stresses that would result from fast starts from a cold iron condition.

Each heat recovery steam generator 14 will be designed with a fan 10 to allow for fresh air firing of directly injected fuel (i.e. natural gas) which produces steam even when the associated combustion turbine generator 4 is idle. The heat recovery steam generator 14 will be sized to produce more steam than that generated just by the recovery of heat from the combustion turbine generator 4 at maximum design load. This additional steam will be generated by injecting supplemental fuel 12, such as natural gas, into a "duct burner" in the exhaust path between the combustion turbine generator 4 and heat recovery steam generator 14 while the combustion turbine generators 4 is operating with its exhaust directed to the heat recovery steam generator 14.

The controls for the boilers, combustion turbine generators 4, heat recovery steam generators 14, steam turbine generators 20, fresh air firing fans 10, duct burners, and all other power plant systems will be integrated into a central plant control system. If required, the generating units can be connected to Automatic Generator Control (AGC) systems to allow for remote automatic adjustments to the operating set points. AGC systems, together with real time communications systems (i.e. telemetry), are used by utility dispatch control centers to balance generators across their service territory with changes in load demand and individual generator outputs (i.e. wind generators).

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A system for balancing energy delivered to a power grid, comprising:
    a boiler for generating high-pressure steam;
    at least one steam turbine generator associated with said boiler and interconnected to the power grid;
    at least one heat recovery steam generator interconnected to said steam turbine generator;
    at least one combustion turbine generator interconnect to said at least one heat recovery steam generator;
    wherein said system is continuously operating wherein heat energy is consistently delivered to said boiler such that when energy delivered to the power grid by a primary power producing element decreases below a predetermined level, said at least one steam turbine generator or said at least one combustion turbine generator is initiated to create additional energy;
    at least one fan associated with said at least one heat recovery steam generator that supplies hot gas to said at least one heat recovery steam generator; and
    wherein the system is operable in a first mode of operation, a second mode of operation, a third mode of operation, and a fourth mode of operation, wherein:
        in said first mode of operation said at least one fan directs combusted fuel and air to said at least one heat recovery steam generator to produce steam to be used by said at least one steam turbine generator,
        in said second mode of operation said at least one combustion turbine generator operates alone to generate power,
        in said third mode of operation said energy comprised of energy generated by said at least one combustion turbine generator combined and energy generated by said at least one steam turbine generator, and
        in said fourth mode of operation supplemental firing fuel is added to said at least one heat recovery steam generator which provides additional steam to said at least one steam turbine generator.

2. The system of claim 1 wherein said at least one combustion turbine generator is comprised of an aero-derivative type combustion turbine engine.

3. The system of claim 1 wherein said at least one combustion turbine generator, at least one heat recovery steam generator, and said at least one steam turbine generator produces a continuous range of energy outputs.

4. A system for balancing energy delivered to a power grid, comprising:
    a boiler for generating high-pressure steam;
    a steam turbine generator associated with said boiler and interconnected to the power grid;
    a first heat recovery steam generator interconnected to said steam turbine generator;
    a second heat recovery steam generator interconnected to said steam turbine generator;
    a first combustion turbine generator interconnect to said first heat recovery steam generator;
    a second combustion turbine generator interconnect to said second heat recovery steam generator;
    a first fan interconnected to said first heat recovery steam generator and a second fan interconnected to said second heat recovery steam generator; and
    wherein the system is operable in a first mode of operation, a second mode of operation, a third mode of operation, and a fourth mode of operation, wherein:
        in said first mode of operation said first fan directs combusted fuel and air to said first heat recovery steam generator to produce steam to be used by said steam turbine generator,
        in said second mode of operation said first combustion turbine generator operates alone to generate power,
        in said third mode of operation said energy comprised of energy generated by said first combustion turbine generator combined and energy generated by said steam turbine generator, and
        in said fourth mode of operation supplemental firing fuel is added to said first heat recovery steam generator which provides additional steam to said steam turbine generator.

5. The system of claim 4 wherein said first combustion turbine generator is associated with a first bypass stack and said second combustion turbine generator is associated with a second bypass stack.

6. A system for balancing energy delivered to a power grid; comprising:
    a boiler for generating high-pressure steam;
    a steam turbine generator associated with said boiler and interconnected to the power grid;
    a first heat recovery steam generator interconnected to said steam turbine generator;
    a second heat recovery steam generator interconnected to said steam turbine generator;
    a first combustion turbine generator interconnect to said first heat recovery steam generator;
    a second combustion turbine generator interconnect to said second heat recovery steam generator;
    a first fan interconnected to said first heat recovery steam generator and a second fan interconnected to said second heat recovery steam generator; and
    wherein the system is operable in a first mode of operation, a second mode of operation, a third mode of operation, and a fourth mode of operation, wherein:
        in said first mode of operation said first fan directs combusted fuel and air to said first heat recovery steam generator and said second fan directs combusted fuel and air to said second heat recovery steam generator to produce steam to be used by said steam turbine generator,
        in said second mode of operation said first combustion turbine generator and said second combustion turbine generator operate alone to generate power,
        in said third mode of operation said energy comprised of energy generated by said first combustion turbine generator and said second combustion turbine generator are combined with energy generated by said first steam turbine generator and said second steam turbine generator, and in said fourth mode of operation supplemental firing fuel is added to at least one of said first heat recovery steam generator and said second heat recovery generator.

7. The system of claim 6 wherein said first combustion turbine generator is associated with a first bypass stack and said second combustion turbine generator is associated with a second bypass stack.

* * * * *